Inventor:
Walter Klatt

Inventor:
Walter Klatt

Inventor:
Walter Klatt

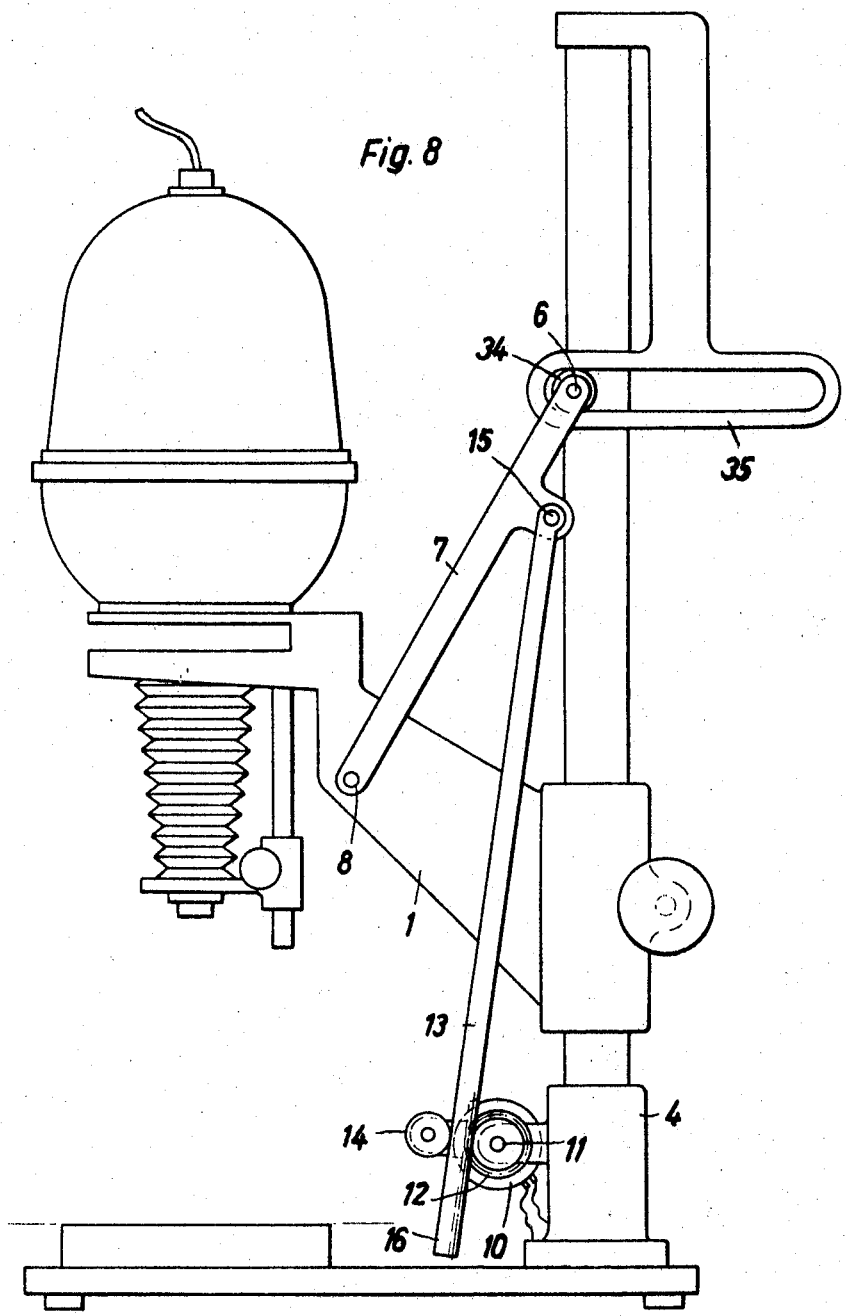

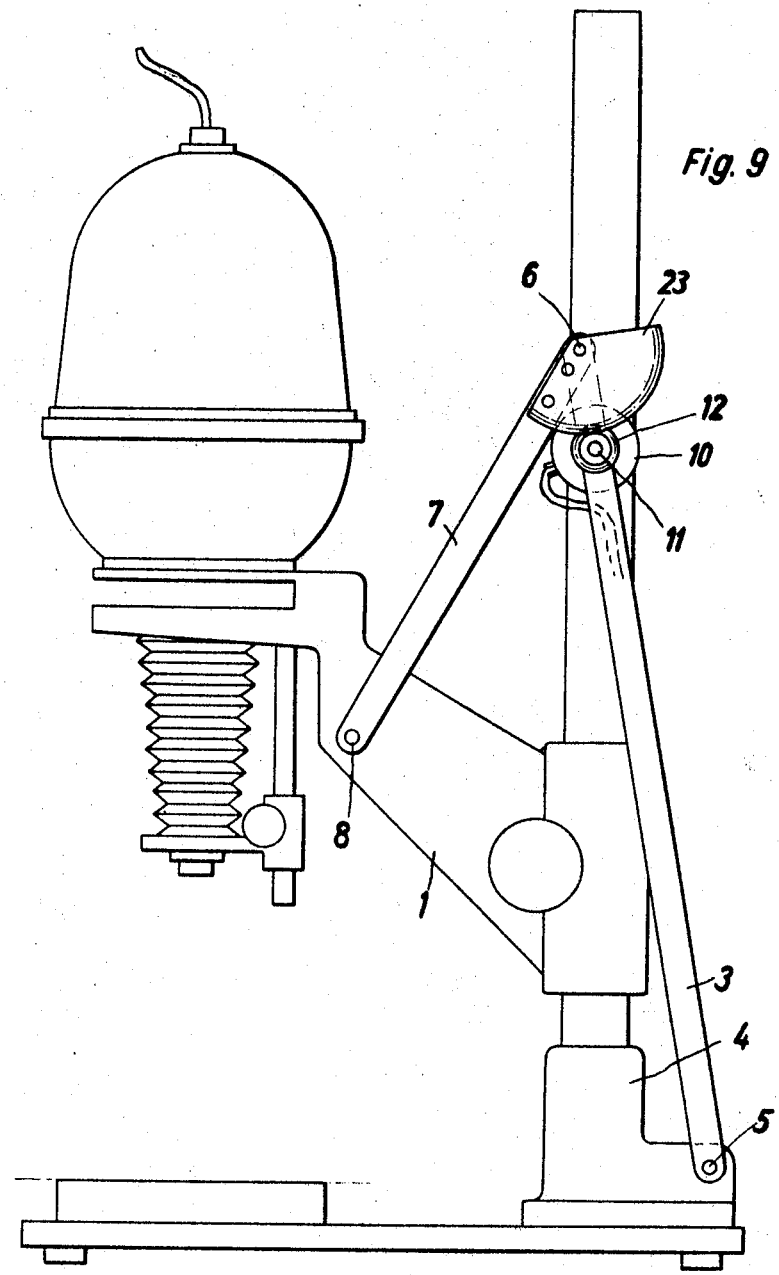

United States Patent Office 3,445,162
Patented May 20, 1969

3,445,162
DEVICE FOR AUTOMATICALLY CONTROLLING THE EXPOSURE TIME FOR PHOTOGRAPHIC ENLARGING DEVICES
Walter Klatt, 34 Bergwaldstrasse, 7261 Gechingen, Kreis Calw, Germany
Filed Jan. 13, 1967, Ser. No. 609,118
Claims priority, application Germany, Jan. 15, 1966, K 58,150
Int. Cl. G03b 27/72
U.S. Cl. 355—56                   11 Claims

ABSTRACT OF THE DISCLOSURE

Photographic enlarger with camera device adjustable along a column and having a resistor adjustable to adjust exposure time wherein movement of the camera device along the column automatically adjusts the resistor by a linkage system which may also adjust the sharp focusing structure of the camera device.

---

The present invention relates to photographic enlarging devices for line reproduction. This type of enlarging devices also encompasses the so-called photo setting devices (Photosetzgeräte). These last mentioned enlarging devices are photographic enlarging devices by means of which written negatives are enlarged in a line manner. Negatives in line manner comprise solely fully transparent and fully covered picture stations.

The exposure time is thus, with each negative and at the same scale of enlargement, constant. The exposure time changes with the scale of enlargement with the second power of the distance.

Heretofore, with such enlarging devices, the exposure time was adjusted according to experience or by means of tables. To this end, in a manner known per se, the axis of a potentiometer for low tension current is turned and the discharging time of a condenser is so influenced that after the discharging time has expired, the switch for the high tension current light source is actuated. The discharging time thus corresponds to the exposure time.

Devices have become known, in which the exposure time is controlled by a resistance wire or by a resistance coil arranged along the guiding column (Leitsäule). The tap or pick-up is effected in conformity with the position of the enlarging head. The control of the exposure time in the form of a square characteristic and in particular in view of the possibility also manually to adjust any desired value, is rather difficult in this connection and cannot be realized with the necessary precision.

Furthermore devices have become known according to which between the enlarging head and the baseboard there is arranged a so-called Nürnberg scissors (Nürnberger Schere), a device consisting of two-arm levers extending in one and the same direction and pivotally interconnected at the crossing points the length of which can be increased and decreased by more or less spreading the free ends of the lever arms toward or away from each other. A pointer connected to the outer end of said Nürnberg scissors indicates a corresponding value on a scale. This value must be read and transferred to a time signal transmitter. The reading and adjusting of a value in a dark room represents a considerable additional work load for the operator.

It is, therefore, an object of the present invention to provide a device which will eliminate this additional work load.

It is another object of this invention to provide a device for automatically controlling the exposure time of photographic enlarging devices which will be reliable in operation and simple in construction.

These and other objects and advantages of the invention will appear more clearly from the following specification in connection with the accompanying drawings, in which:

FIG. 1 diagrammatically illustrates an enlarging device with a variable resistor drive for approximately correct exposure times and, more specifically, indicates the lowermost position of the device in full lines while the uppermost position is indicated in dot-dash lines.

FIG. 8 shows an enlarging device without automatic sharp focusing in its lowermost position with a variable resistor drive according to FIG. 1.

FIG. 9 is an enlarging device without automatic sharp focusing in its lowermost position with a variable resistor drive according to FIGS. 4 and 5 or FIGS. 6 and 7.

According to the present invention, the adjustment of the exposure time is automated by the fact that the rotary movement of a variable resistor is in conformity with the required theoretic principles produced by an element of the enlarging device which is displaceable as to height.

The automatic exposure control is applicable within the ordinary range of enlargement. When reductions and excessive enlargements are to be effected, the exposure time must be adjusted manually as heretofore. To this end, the drive of the variable resistor shaft can be turned off and a scale wheel connected thereto can be adjusted for any desired exposure time.

Figure 1:
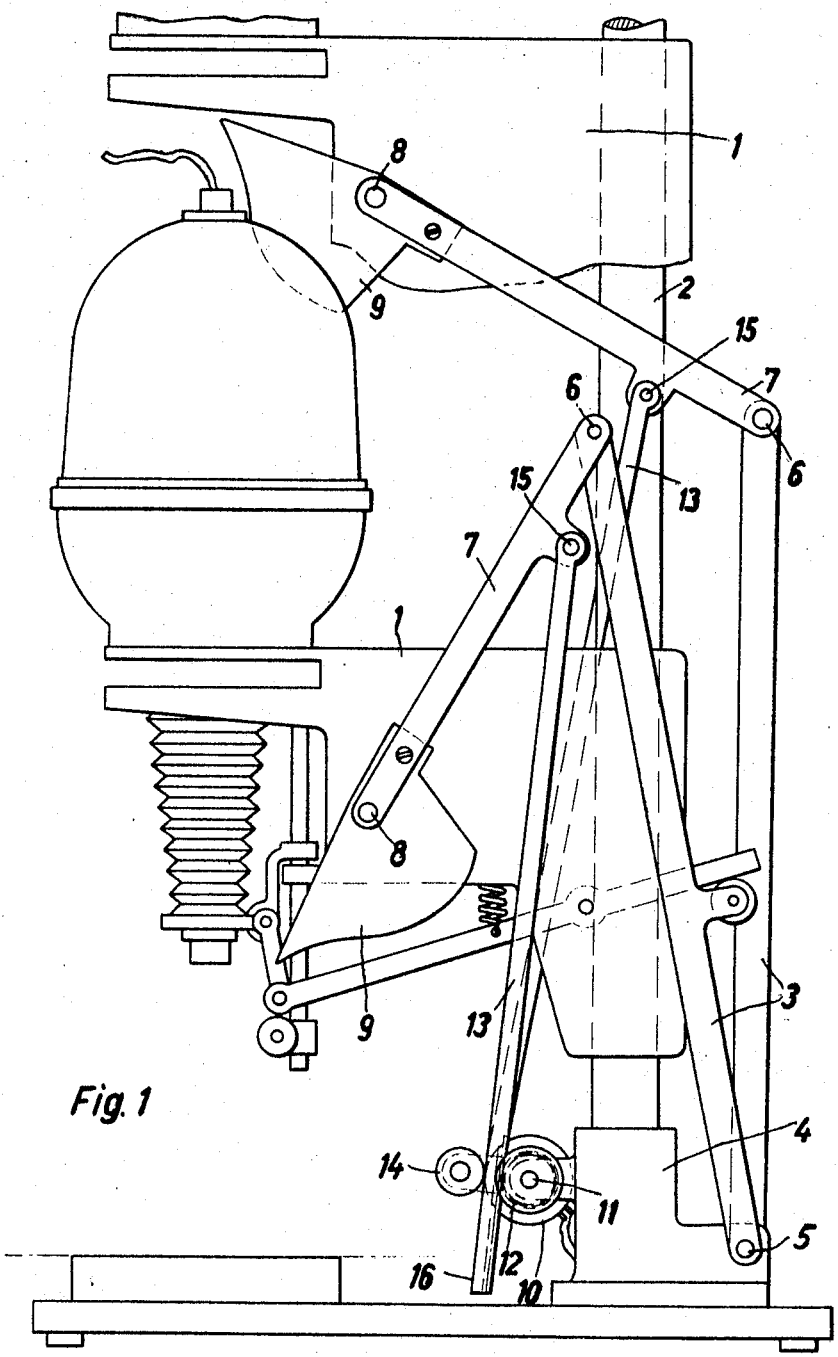

Referring now to the drawings in detail, the body 1 of the apparatus (FIG. 1) is longitudinally displaceably mounted on a column 2. The linkage system 3 is at 5 pivotally journalled on the foot 4 of the apparatus, and at the joint 6 is pivotally connected to the lever arm 7. Lever arm 7 is pivotable at 8 and, in a manner known per se, actuates the control cam 9 for the automatic sharp focusing of the objective.

Connected to the foot portion 4 of the apparatus is a linearly effective variable resistor 10. The axis of rotation 11 of said resistor 10 has fixedly connected thereto a gear 12 which meshes with a gear rack 13 adapted to be held in meshing engagement with gear 12 by a roller 14. Rack 13 is at 15 pivotally connected to the lever 7. When the apparatus occupies its lower position, points 6 and 15 as well as the end 16 of rack 13 are in approximately linear alignment with each other. When the body 1 of the apparatus is now moved upwardly, the displacement speed of rack 13 increases and thus the angular velocity of the variable resistor 11 increases to a maximum value which is obtained by the angular position of points 6, 15 and 16 in the uppermost position of the apparatus.

Figure 2:
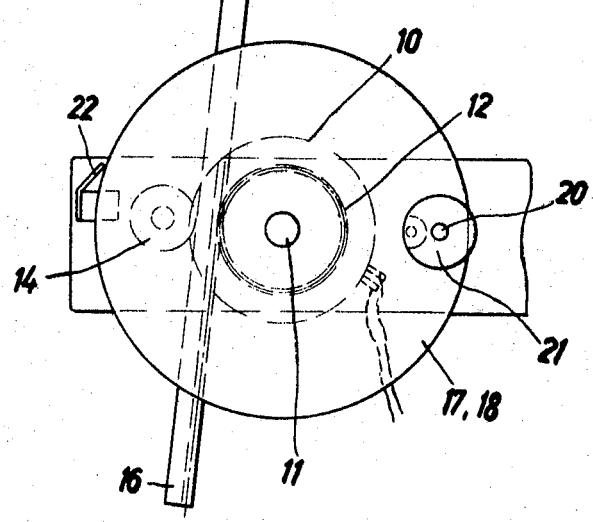
FIG. 2 is a side view of the device for turning off the automatic mechanism and manually adjusting the exposure time.
Figure 3:
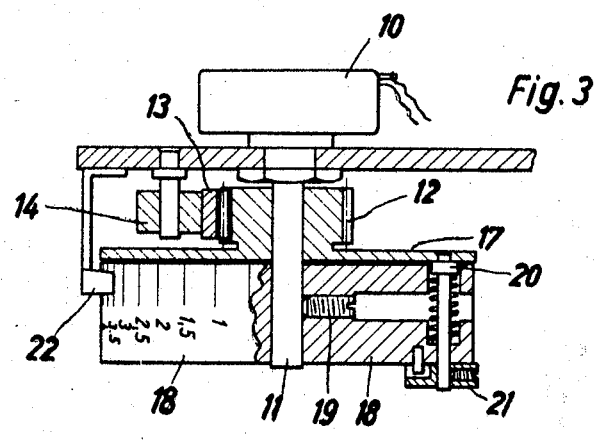
FIG. 3 is a top view, partly in section, of the arrangement shown in FIG. 2.

With the device for manually turning off the drive for the variable resistor and adjusting the exposure time (FIGS. 2 and 3), the gear 12 together with disc 17 is loosely mounted on shaft 11 for the variable resistor. The scale wheel 18 is by means of a screw 19 firmly connected to shaft 11. As long as the resilient pin 20 engages the respective bore pertaining thereto in disc 17, the rotation of shaft 11 will be effected automatically. When this pin connection or coupling is disengaged by withdrawal and turning of the handle 21, it is possible by turning the scale wheel 18 to adjust any desired exposure time in any position of the apparatus. The adjusting value or adjustment is read by pointer 22.

Figure 4:
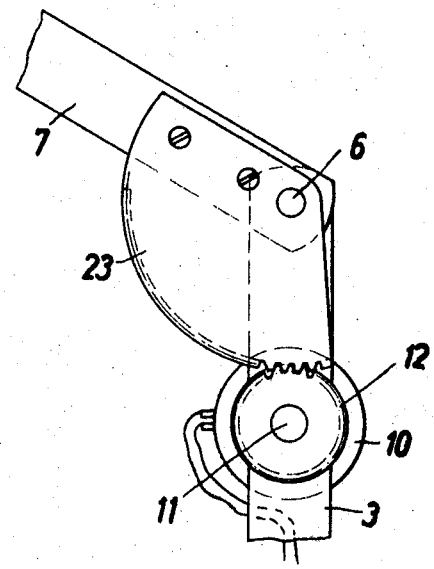
FIG. 4 illustrates a side view of a further variable resistor drive for approximately correct exposure time in the uppermost position of the device.
Figure 5:
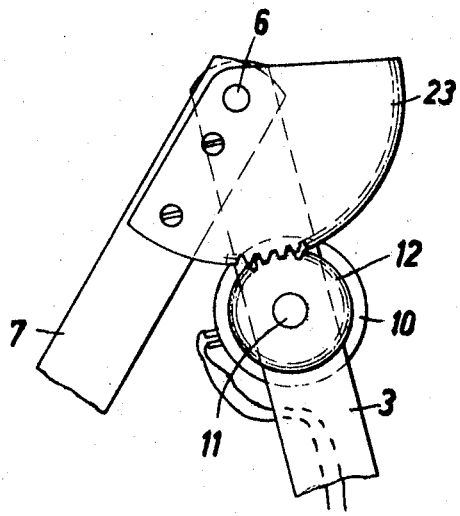
FIG. 5 shows the same device as FIG. 4 but in its lowermost position.

A further embodiment of the invention for approximately correct exposure times is shown in FIGS. 4 and 5. Connected to lever 3 is the variable resistor 10 effective with the second power and connected to the lever 7 of the gear segment 23. Gear segment 23 meshes with gear 12 which is fixedly connected to shaft 11 of the resistor and is operable during the upward and downward movement of the apparatus body 1 to uniformly turn shaft 11 and gear 12. Inasmuch as the resistance of the resistor 10 changes with the second power, the approximately correct exposure time will be obtained. The minor differences are due to the fact that the changes in the angle of levers 3 and 7 are not proportional to the vertical movement of the body 1.

Figure 6:
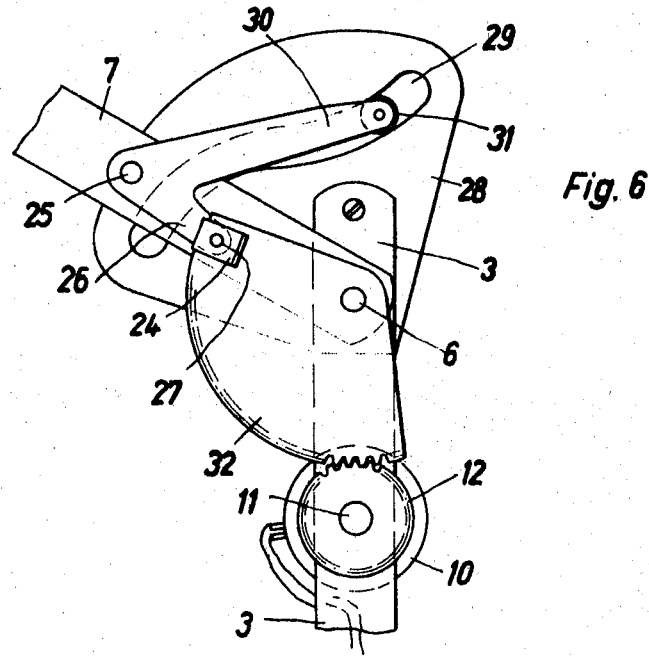
FIG. 6 is the side view of a variable resistor drive for theoretically correct exposure times in its uppermost position.
Figure 7:
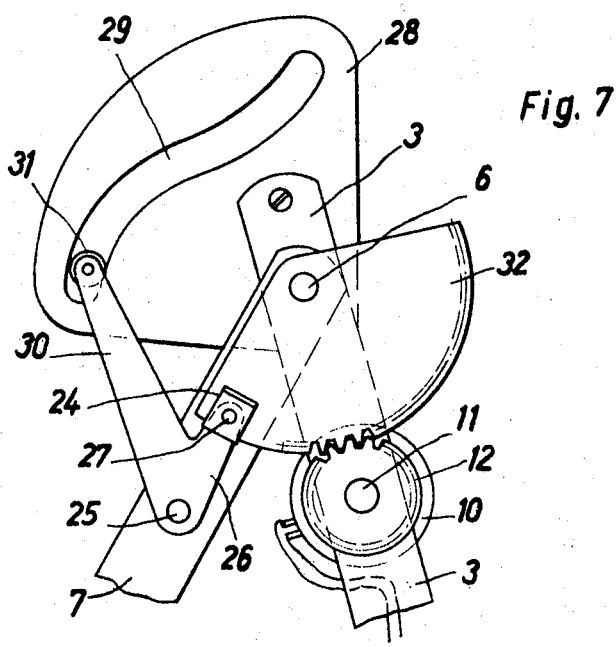
FIG. 7 shows the same device as FIG. 6 but in its lowermost position.

FIGS. 6 and 7 show a device for the theoretically correct drive of the resistor 10. For reasons of manufacture, said resistor is advantageously linearly effective. Also with this embodiment, the variable resistor 10 is connected to lever 3, and gear 12 is fixedly connected to shaft 11. The driving gear segment 32 which meshes with gear 12 is rotatably journalled at 6 and has one side provided with a groove in which the block 24 is displaceable.

Fixedly connected to lever 3 is a disc 28 with a slot 29 acting as cam. At point 25 on lever 7 there is pivotally journalled a two-arm lever having its shorter arm 26 provided with the joint pin 27 serving as point or rotation for block 24. The long arm 30 of said two-arm lever has a roller 31 which engages the cam slot 29. If cam slot 29 were circular and concentric with point 6, the same driving conditions would prevail as with the embodiment of FIGS. 4 and 5. By correspondingly shaping cam slot 29, the angular velocity of shaft 11 can in each phase be adapted to the theoretic exposure time.

FIG. 8 represents an enlarging device without automatic sharp focusing. More specifically, at 8 of the apparatus body 1 there is pivotally connected the left-hand end of lever 7, whereas the right-hand end with the rotatable roller 34 journalled at 6 is displaceable in slot 35. Rack 13 is pivotally connected to lever 7 at 15. The drive for the variable resistor is the same as described in connection with FIG. 1.

Finally, FIG. 9 illustrates an enlarging device without automatic sharp focusing. This device has levers 3 and 7 pivotally connected to the foot portion 4 and the apparatus body 1 respectively. With this arrangement, a resistor drive according to FIGS. 5 or 7 may be employed.

It is, of course, to be understood that the present inventin is, by no means, limited to the particular arrangements shown in the drawings but also comprises any modifications within the scope of the appended claims.

What is claimed is:

1. In a photographic enlarger having a stationary structure including a base and a column upstanding therefrom, a moveable structure including a frame adjustable in translation along the column and a camera device thereon, electrically operated exposure controlling means for the camera device including a resistor adjustable to vary the exposure time, said resistor comprising a first part and a second part moveable relative to said first part for adjusting said resistor, the improvement comprising; a first toothed member operatively connected to said second reresistor part for movement thereof relative to said first resistor part, a second toothed member meshing with said first toothed member, a first link having one end pivoted to said moveable structure, first means connecting the other end of said link to said stationary structure so the link will tilt relative to said structure as said moveable structure is moved along said column, second means connecting said second toothed member to said link, and third means connecting said first resistor part to said stationary structure.

2. In a photographic enlarger according to claim 1 in which said camera device includes an adjustable sharp focusing arrangement, said link being operatively connected to said sharp focusing arrangement to effect adjustment thereof in response to movement of said moveable structure along said column.

3. In a photographic enlarger according to claim 1 in which said resistor has substantially linear characteristics and said second means is constructed and arranged so that the amount of adjustment of said first toothed member by said second toothed member as said link moves is on the order of a function of substantially the second power of the amount of movement of said moveable structure along said column.

4. In a photographic enlarger according to claim 1 in which said resistor has second power characteristics and said second means is constructed and arranged so that the amount of adjustment of said first toothed member by said second toothed member as said link moves is substantially a linear function of the amount of movement of said moveable structure along said column.

5. In a photographic enlarger according to claim 1 in which said first means is a second link pivoted at one end to the said other end of the first link and pivoted at the other end to said stationary structure, said first resistor part being mounted on said second link adjacent the said one end thereof, and said second means being connected to the first mentioned link adjacent said other end thereof.

6. In a photographic enlarger according to claim 5 in which said second means comprises means for adjusting the rate of movement of said second toothed member as the first link moves to impart second power characteristics to the adjustment of said resistor.

7. In a photographic enlarger according to claim 5 in which said second means comprises a slotted cam fixed to said one end of said second link, a two arm lever pivoted on said first link and having one arm engaging the slot of said cam, said second toothed member comprising a gear sector pivoted at the juncture of said link, the second arm of said two arm lever extending substantially radially toward said sector and engaging said sector near the periphery thereof, and said first toothed member comprising a gear connected to said second resistor part and in mesh with said gear sector.

8. In a photographic enlarger according to claim 1 in which adjustable clutch means is provided connecting said first toothed member to said second resistor part to permit adjustment of said second resistor part independently of said first toothed member.

9. In a photographic enlarger according to claim 1 in which said first means is a second link pivoted at one end to the other end of the first link and pivoted at its other end to said stationary structure, said first toothed member being in the form of a gear, said second toothed member being a rack, said second means comprising a bar having said rack formed on one end thereof and pivoted at its other end to said first link near the said other end thereof, and said third means comprising means connecting said first resistor part stationarily to said stationary structure.

10. In a photographic enlarger according to claim 1 in which said first means is a second link pivoted at one end to the other end of the first link and pivoted at its other end to said stationary structure, said third means comprising means fixedly connecting said first resistor part to said second link adjacent said one end thereof, said first toothed member being in the form of a gear, said second toothed member being in the form of a gear sector having its center at the juncture of said links, said second means comprising means fixing said sector to said first link.

11. In a photographic enlarger according to claim 1 in which said first means is a member fixed to said stationary structure and having a slot therein extending transverse to the direction of the length of said column, the other end of the said first link slidably engaging said slot, said first toothed member being in the form of a gear, said second toothed member being a rack, said second means comprising a bar having said rack formed on one end thereof and pivoted at its other end to said link near the said other end thereof, and said third means comprising means connecting said first resistor part stationarily to said stationary structure.

References Cited
UNITED STATES PATENTS

| | | | |
|---|---|---|---|
| 2,460,443 | 2/1949 | Benton | 88—24 |
| 2,561,535 | 7/1951 | Paulet et al. | 88—24 |
| 3,227,039 | 1/1966 | Simmon | 88—24 |

NORTON ANSHER, *Primary Examiner.*

W. A. SIVERTSON, *Assistant Examiner.*